US011935688B2

(12) United States Patent
Yamamoto et al.

(10) Patent No.: US 11,935,688 B2
(45) Date of Patent: Mar. 19, 2024

(54) COIL COMPONENT AND ELECTRONIC DEVICE

(71) Applicant: TAIYO YUDEN CO., LTD., Tokyo (JP)

(72) Inventors: Asa Yamamoto, Takasaki (JP); Tetsuo Kumahora, Takasaki (JP); Tsutomu Kojima, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 1021 days.

(21) Appl. No.: 16/791,829

(22) Filed: Feb. 14, 2020

(65) Prior Publication Data

US 2020/0279685 A1 Sep. 3, 2020

(30) Foreign Application Priority Data

Feb. 28, 2019 (JP) ................................. 2019-036841

(51) Int. Cl.

*H01F 27/28* (2006.01)
*H01F 5/04* (2006.01)
*H01F 17/04* (2006.01)
*H01F 27/29* (2006.01)
*H01F 41/10* (2006.01)

(52) U.S. Cl.

CPC ....... *H01F 27/2828* (2013.01); *H01F 17/045* (2013.01); *H01F 27/292* (2013.01); *H01F 41/10* (2013.01); *H01F 5/04* (2013.01)

(58) Field of Classification Search

CPC .. H01F 27/2828; H01F 17/045; H01F 27/292; H01F 41/10; H01F 5/04
See application file for complete search history.

(56) References Cited

U.S. PATENT DOCUMENTS

| | | | | |
|---|---|---|---|---|
| 4,700,044 A * | 10/1987 | Hokanson | .............. | H05K 13/06 219/121.64 |
| 6,027,008 A * | 2/2000 | Toi | ....................... | B23K 20/023 228/111.5 |
| 9,877,399 B2 * | 1/2018 | Ogawa | ................ | H05K 3/3494 |

(Continued)

FOREIGN PATENT DOCUMENTS

| | | |
|---|---|---|
| JP | 2009158777 A | 7/2009 |
| JP | 2015037156 A | 2/2015 |
| JP | 2018041852 A | 3/2018 |

*Primary Examiner* — Bickey Dhakal
*Assistant Examiner* — Malcolm Barnes
(74) *Attorney, Agent, or Firm* — Law Office of Katsuhiro Arai

(57) ABSTRACT

A coil component includes: a substrate body; a winding part formed by a conductive wire wound around a part of the substrate body; and terminal electrodes, each having a foundation part constituted by a metal plate provided to the substrate body, and a welded part formed on the foundation part wherein a part of the metal plate is welded to the conductive wire at a lead part led out from the winding part; wherein, based on a vertical line which passes through the peak point of the welded part where its height becomes the highest and which also intersects at right angles the foundation part, the distance from the vertical line to the surface of the welded part as viewed in a direction parallel with the foundation part is longer at a point closer to the foundation part when viewed at least in one direction from the vertical line.

13 Claims, 13 Drawing Sheets

(56) References Cited

U.S. PATENT DOCUMENTS

| | | | | |
|---|---|---|---|---|
| 2008/0003865 | A1* | 1/2008 | Hatakeyama | H01F 17/045<br>439/399 |
| 2013/0048616 | A1* | 2/2013 | Morimoto | B23K 1/0056<br>219/121.64 |
| 2015/0162126 | A1* | 6/2015 | Kanbe | H01F 27/2823<br>29/605 |
| 2016/0365191 | A1* | 12/2016 | Horie | H01F 27/292 |
| 2017/0301455 | A1* | 10/2017 | Kobayashi | H01F 27/2823 |
| 2017/0345557 | A1* | 11/2017 | Igarashi | H01F 5/06 |
| 2018/0040414 | A1* | 2/2018 | Yoshizawa | H01F 27/292 |
| 2018/0068781 | A1 | 3/2018 | Igarashi et al. | |
| 2018/0096790 | A1* | 4/2018 | Murakami | H01F 41/076 |
| 2018/0261381 | A1* | 9/2018 | Igarashi | H01F 27/32 |
| 2018/0330869 | A1* | 11/2018 | Kim | H01F 27/2823 |
| 2018/0374638 | A1* | 12/2018 | Igarashi | H01F 17/04 |

* cited by examiner

COIL COMPONENT AND ELECTRONIC DEVICE

CROSS-REFERENCE TO RELATED APPLICATIONS

The present application claims priority to Japanese Patent Application No. 2019-036841, filed Feb. 28, 2019, the disclosure of which is incorporated herein by reference in its entirety including any and all particular combinations of the features disclosed therein.

BACKGROUND

Field of the Invention

The present invention relates to a coil component and an electronic device.

Description of the Related Art

It is known that, in order to electrically connect a conductive wire that forms a winding part with terminal electrodes formed by metal plates, the end parts of the conductive wire are joined with parts of the metal plates by means of arc welding or laser welding (refer to Patent Literatures 1 and 2, for example).

BACKGROUND ART LITERATURES

[Patent Literature 1] Japanese Patent Laid-open No. 2009-158777

[Patent Literature 2] Japanese Patent Laid-open No. 2018-41852

SUMMARY

When a conductive wire is joined with a part of a metal plate by means of welding, the fused portion rises and a welded part of rounded shape is formed. Conventional coil components having such welded parts have room for improvement in terms of size reduction.

An object of the present invention is to provide a coil component that permits size reduction.

The present invention is a coil component comprising: a substrate body; a winding part formed by a conductive wire wound around a part of the substrate body; and terminal electrodes, each having a foundation part constituted by a metal plate provided on the surface of a part of the substrate body, and a welded part formed on the foundation part through welding of a part of the metal plate to the conductive wire, where the conductive wire is electrically connected to a lead part led out from the winding part; wherein, based on a vertical line which passes through the peak point of the welded part where its height from the foundation part becomes the highest and which also crosses at right angles with the foundation part, the distance from the vertical line to the surface of the welded part as viewed in a direction parallel with the foundation part is longer at a point closer to the foundation part when viewed at least in one direction from the vertical line.

In the aforementioned constitution, the constitution may be such that the distance from the vertical line to the surface of the welded part as viewed in a direction parallel with the foundation part is longer at a point closer to the foundation part when viewed at least in the direction of the lead part side from the vertical line.

In the aforementioned constitution, the constitution may be such that the maximum distance from the vertical line to the surface of a welded part in parallel with the foundation part, as viewed in the direction of the lead part side, is longer than the distance from the foundation part to the peak point.

In the aforementioned constitution, the constitution may be such that: the welded part has a dome shape; and the angle formed between the portion of the foundation part contacted by the welded part and the surface of the welded part, is smaller than 60°.

In the aforementioned constitution, the constitution may be such that the welded part has a larger area for its cross-section orthogonal to the vertical line when the cross-section is closer to the foundation part.

In the aforementioned constitution, the constitution may be such that the welded part is formed on the foundation part in a manner contained within the range where the surface of the substrate body on which the welded part is provided overlaps the foundation part in plan view.

In the aforementioned constitution, the constitution may be such that the terminal electrodes each have an engagement part that locks the conductive wire.

In the aforementioned constitution, the constitution may be such that: the substrate body is a core that includes a winding core and flange parts provided at the end parts of the winding core in the axial direction; the terminal electrodes are placed on the flange parts; the winding part is formed by the conductive wire being wound around the winding core; and the lead parts are where the conductive wire is led out from the winding core to the terminal electrodes placed on the flange parts.

In the aforementioned constitution, the constitution may be such that: the substrate body includes a core that includes a winding core and flange parts provided at the end parts of the winding core in the axial direction, and an exterior core placed on the outer periphery of the core; the terminal electrodes are placed on the exterior core; the winding part is formed by the conductive wire being wound around the winding core; and the lead parts are where the conductive wire is led out from the winding core to the terminal electrodes placed on the exterior core.

The present invention is an electronic device comprising: the aforementioned coil component; and a circuit board on which the coil component is mounted.

According to the present invention, size reduction of a coil component becomes possible.

BRIEF DESCRIPTION OF THE DRAWINGS

FIG. 1A is a cross-sectional view of a terminal electrode in a coil component according to the invention under the present application for patent, while

FIG. 3A is a view from the arrow F1 side, while

FIG. 9A is a side view of a welded part, while

DESCRIPTION OF THE SYMBOLS

Figure 1A:
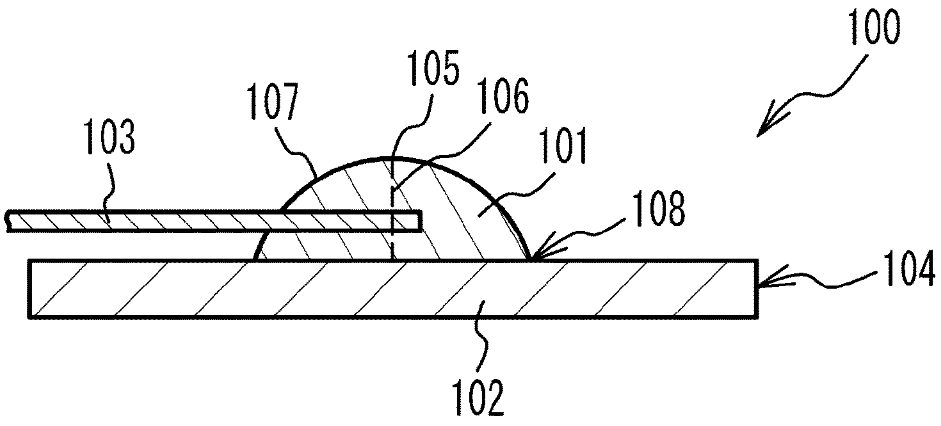

10 Drum core
12 Winding core
14, 16 Flange part
18, 20, 22, 24 Concaved part
30 Winding part
32, 34 Conductive wire
32A, 32B, 34A, 34B Tip face
33A, 33B, 35A, 35B Lead part
36 Core wire
38 Insulating film
40, 42, 44, 46 Terminal electrode
50, 52, 54, 56 Terminal metal plate
60 Metal plate body
62 Locking tab
64 Joining tab
70, 72, 74, 76 Welded part
71 Peak point
73 Vertical line
75 Surface
80, 82, 84, 86 Foundation part
90, 92, 94, 96 Engagement part
100, 200 Terminal electrode
101, 201 Welded part
102, 202 Foundation part
103, 203 Conductive wire
104, 204 Metal plate
105, 205 Peak point
106, 206 Vertical line
107, 207 Surface
108, 208 Maximum diameter part
110 Exterior core
120 Circuit board
122 Electrode
124 Solder
500, 600, 700, 800 Coil component
900 Electronic device

DETAILED DESCRIPTION OF EMBODIMENTS

Figure 1B:
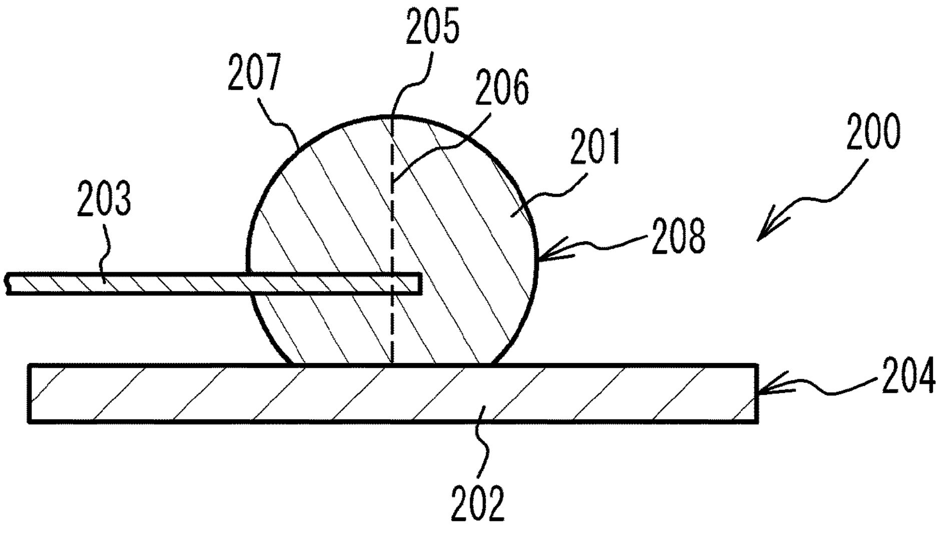
FIG. 1B is a cross-sectional view of a terminal electrode in a coil component representing a comparative example.

First, the constitutions as well as operations and effects of the invention under the present application for patent, are explained. FIG. 1A is a cross-sectional view of a terminal electrode 100 in a coil component according to the invention under the present application for patent, while FIG. 1B is a cross-sectional view of a terminal electrode 200 in a coil component representing a comparative example. FIG. 1A illustrates a cross-section passing through the peak point 105 where the height of the welded part 101 from the foundation part 102 becomes the highest. FIG. 1B illustrates a cross-section passing through the peak point 205 at which the height of the welded part 201 from the foundation part 202 becomes the highest.

The terminal electrode 100 in the coil component according to the invention under the present application for patent has: a foundation part 102 constituted by a metal plate 104; and a welded part 101 formed on the foundation part 102 by a part of the metal plate 104 being welded to a conductive wire 103. The welded part 101 is joined to the foundation part 102 by an alloy layer formed between the welded part 101 and the foundation part 102. The welded part 101 is formed by a part of the metal part 104 fusing to the conductive wire 103, and therefore has a rounded shape resulting from rising of the fused portion.

Now, a vertical line 106 is defined, which passes through a peak point 105 at which the height of the welded part 101 from the foundation part 102 becomes the highest and which also crosses at right angles with the foundation part 102. The welded part 101 is shaped in such a way that the distance from the vertical line 106 to the surface 107 of the welded part 101 as viewed in a direction parallel with the foundation part 102 (also describable as a direction parallel with the face of the foundation part 102 contacted by the welded part 101 and direction crossing at right angles with the vertical line 106), is longer at a point closer to the foundation part 102 when viewed at least in one direction from the vertical line 106. In other words, between the peak point 105 and the foundation part 102, the distance from the vertical line 106 to the surface 107 of the welded part 101 as viewed in a direction parallel with the foundation part 102, is continuously longer from the peak point 105 toward the foundation part 102, being shorter on the peak point 105 side and longer on the foundation part 102 side. This means that the distance from the vertical line 106 to the surface 107 of the welded part 101 as viewed in a direction parallel with the foundation part 102, becomes the longest on the joining face of the welded part 101 with the foundation part 102. Put it differently, among the faces of the welded part 101 running parallel with the foundation part 102, the joining face of the welded part 101 with the foundation part 102 represents the maximum diameter part 108 of the welded part 101. This way, the joining can be achieved without fail and the joining strength can be increased.

In contrast, with the terminal electrode 200 in the coil component representing the comparative example, the shape of its welded part 201 which is formed on a foundation part 202 constituted by a metal plate 204 and to which a conductive wire 203 is connected, is different from that of the welded part 101 representing the invention under the present application for patent. At the welded part 201, the maximum diameter part 208 is positioned above the foundation part 202. For this reason, the distance to the surface 207 of the welded part 201 from the vertical line 206 passing through the peak point 205 and crossing at right angles with the foundation part 202, as viewed in a direction parallel with the foundation part 202, becomes gradually longer from the peak point 205 toward the maximum diameter part 208 and then gradually shorter from the maximum diameter part 208 toward the foundation part 202. When the welded part 201 has such shape, the height of the welded part 201 becomes higher. This makes it difficult to reduce the size of the coil component comprising the welded part 201.

On the other hand, with the terminal electrode 100 in the coil component according to the invention under the present application for patent, the distance from the vertical line 106 to the surface 107 of the welded part 101 as viewed in a direction parallel with the foundation part 102, is longer at a point closer to the foundation part 102 when viewed at least in one direction from the vertical line 106. When the welded part 101 has such shape, the height of the welded part 101 becomes lower compared to the welded part 201 in the coil component representing the comparative example. This permits size reduction of the coil component comprising the welded part 101.

The following explains embodiments of the invention under the present application for patent by referring to the drawings as deemed appropriate. Constitutional elements that are common in multiple drawings are denoted with the same reference symbols throughout the multiple drawings. It should be noted that, for the sake of explanation, the scale in which each drawing was written is not necessarily accurate.

First Embodiment

Figure 2:
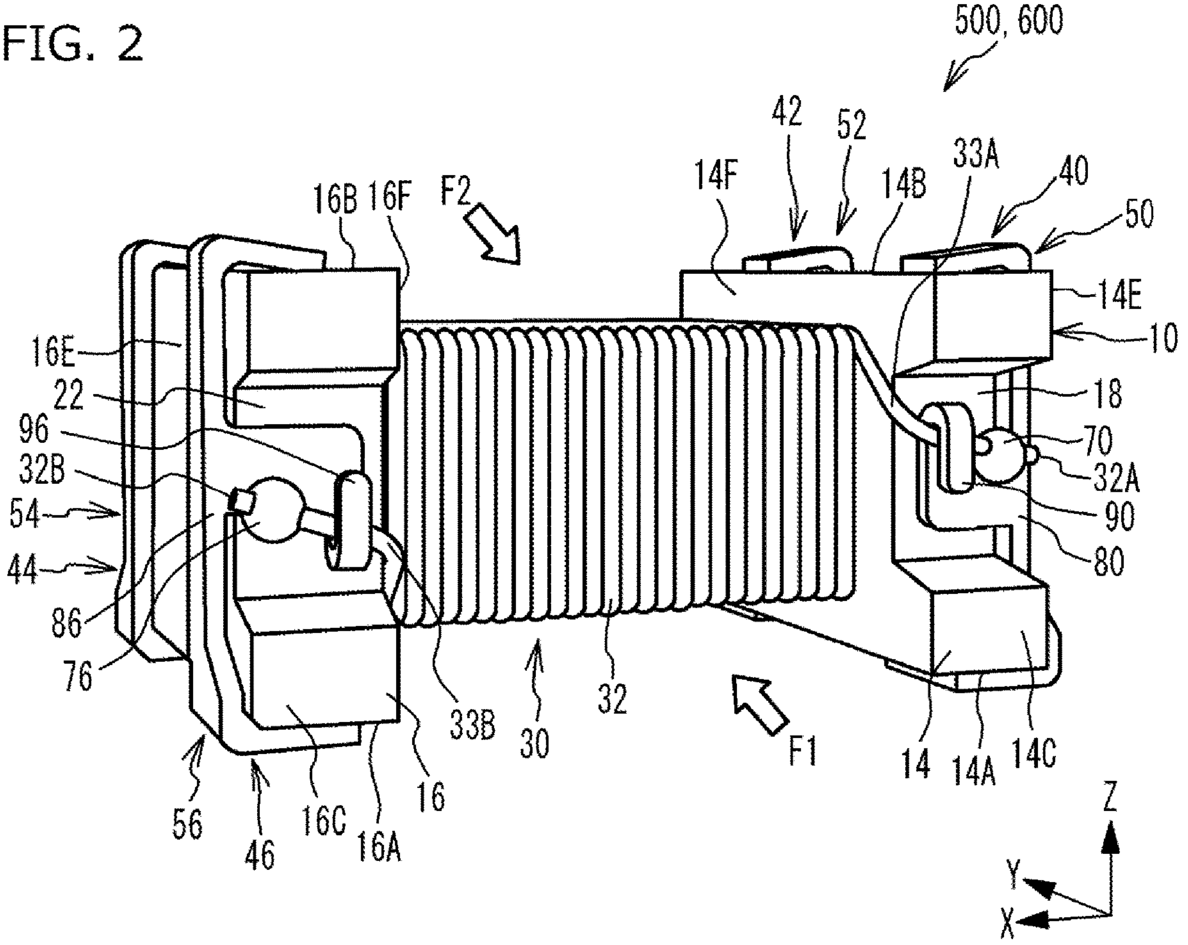
FIG. 2 is a perspective view showing the coil component pertaining to the first embodiment of the invention under the present application for patent.
Figure 3A:
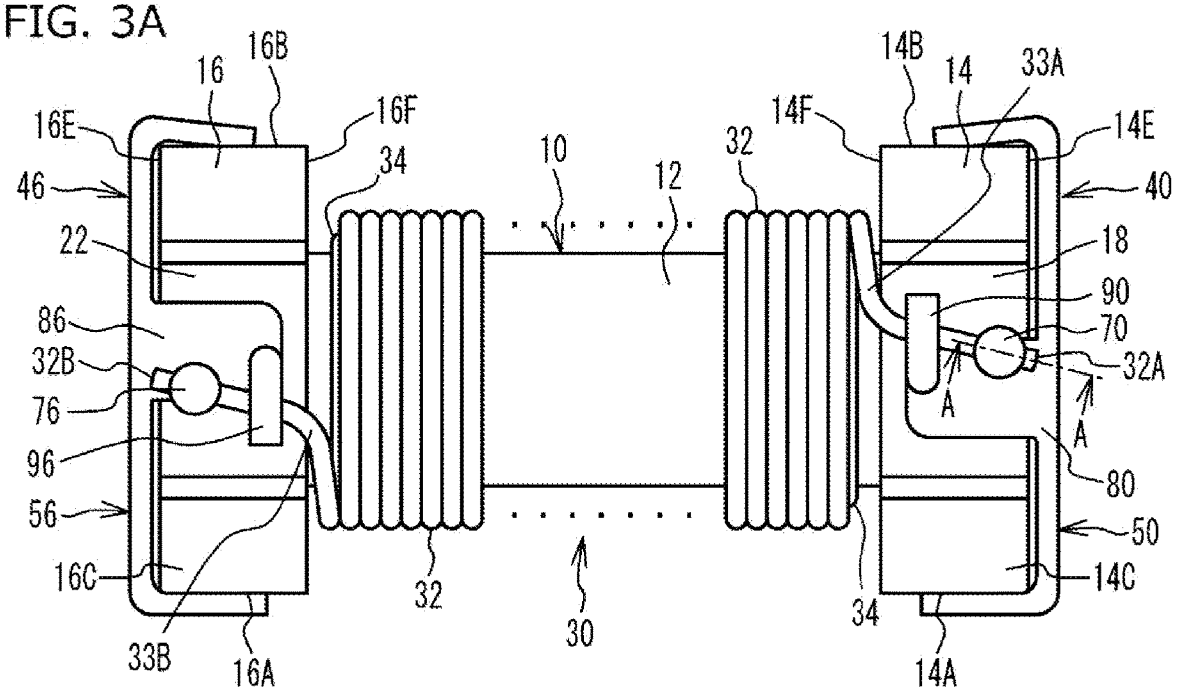
Figure 3B:
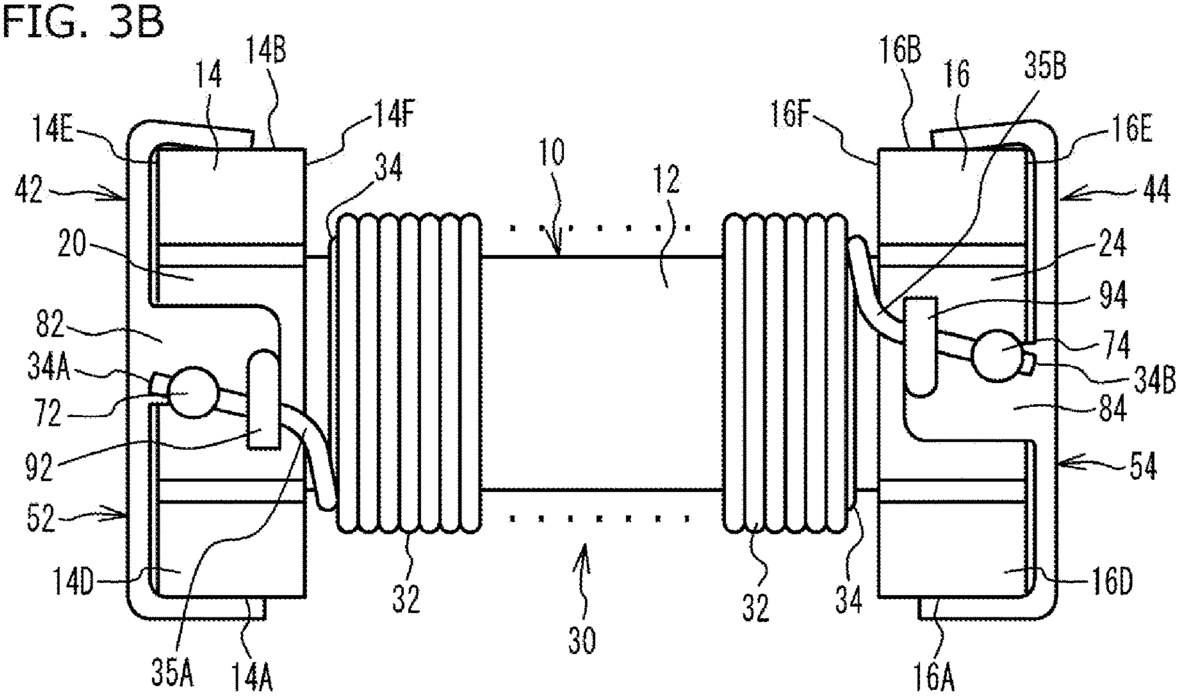
FIG. 3B is a view from the arrow F2 side, of the coil component in FIG. 2.
Figure 4A:
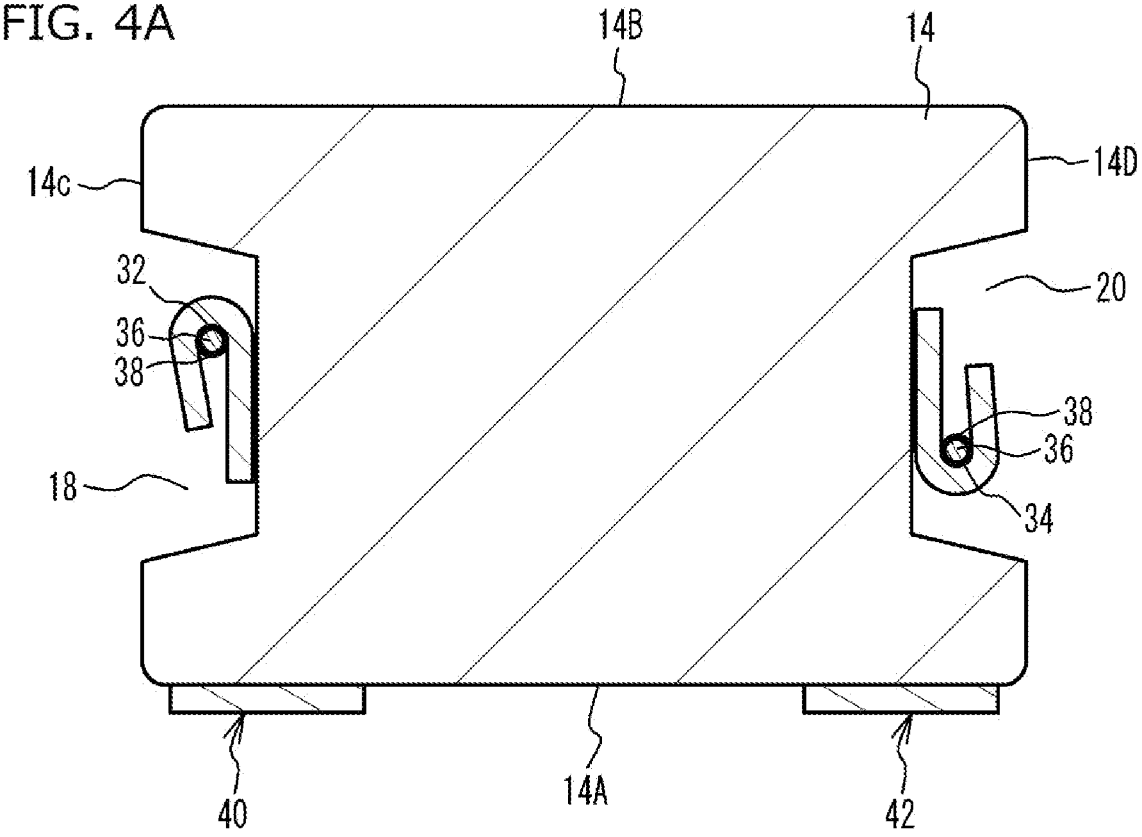
FIGS. 4A and 4B are cross-sectional views of the coil component in FIG. 2 at its flange parts.
Figure 4B:
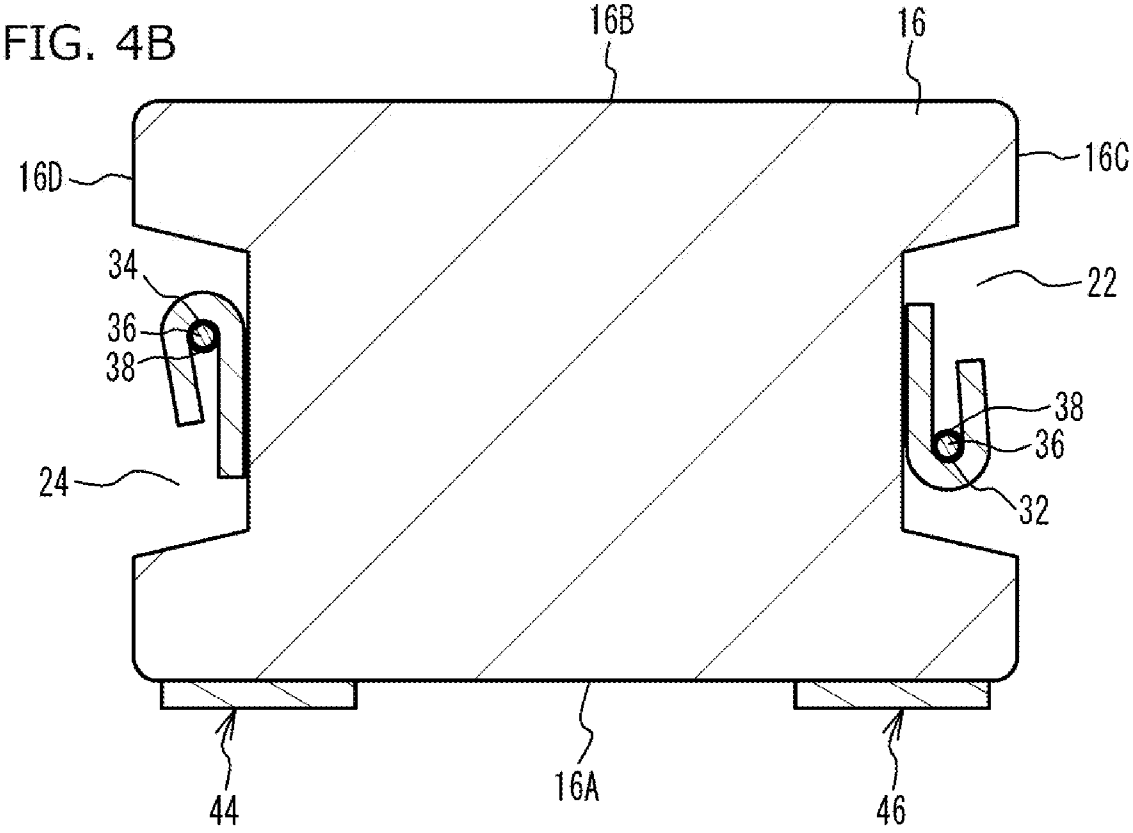
Figure 5:
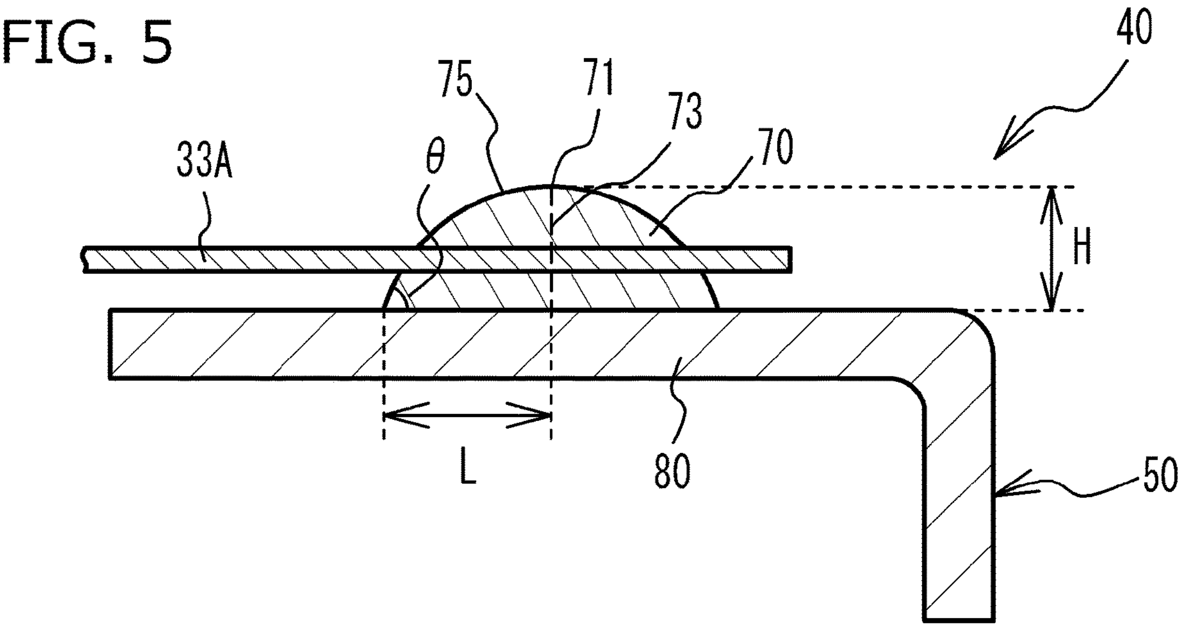
FIG. 5 is a view of cross-section A-A of the terminal electrode in FIG. 3A.

The coil component 500 pertaining to the first embodiment of the invention under the present application for patent is explained by referring to FIGS. 2, 3A, 3B, 4A, 4B, and 5. FIG. 2 is a perspective view showing the coil component 500 pertaining to the first embodiment of the invention under the present application for patent. FIG. 3A is a view of the coil component 500 from the arrow F1 side in FIG. 2, while FIG. 3B is a view of the coil component 500 from the arrow F2 side in FIG. 2. It should be noted that, in FIGS. 3A and 3B, the winding part 30 is partially not shown in order to illustrate the winding core 12 clearly. FIG. 4A is a cross-sectional view at the flange part 14, while FIG. 4B is a cross-sectional view at the flange part 16, of the coil component 500. FIG. 5 is a view of cross-section A-A of the terminal electrode 40 in FIG. 3A. To be specific, FIG. 5 is a view of a cross-section which is orthogonal to the surface of the flange part 14 on which the welded part 70 is provided and which also passes through the peak point 71 at which the height of the welded part 70 from the foundation part 80 becomes the highest and through the center of the conductive wire 32 (center of the lead part 33A).

As shown in FIG. 5, the coil component 500 is such that, between the peak point 71 and the foundation part 80, the distance to the surface 75 of the welded part 70 from the vertical line 73 passing through the peak point 71 and crossing at right angles with the foundation part 80, as viewed in a direction parallel with the foundation part 80, is continuously longer from the peak point 71 toward the foundation part 80, being shorter on the peak point 71 side and longer on the foundation part 80 side. Having the welded part 70 of such dimensional relationships means the height of the peak point 71 of the welded part can be lowered. This permits size reduction of the coil component 500.

The following explains in detail each part constituting the coil component 500. The coil component 500 is described as a common-mode filter by way of example, but the present invention is not limited thereto. As shown in FIGS. 2, 3A, 3B, 4A, 4B, and 5, the coil component 500 comprises a drum core 10, a winding part 30, and terminal electrodes 40, 42, 44, 46. The drum core 10 comprises a winding core 12, a flange part 14 provided at one end part of the winding core 12 in the axial direction, and a flange part 16 provided at the other end part of the winding core 12 in the axial direction. The winding core 12 has a roughly rectangular shape in terms of cross-section shape, for example, but it may have a polygonal shape such as hexagon or octagon, etc., or it may also have a circular shape, oval shape, etc. The flanges 14, 16 each have a rectangular solid shape having concaved parts. The drum core 10 is formed by Ni—Zn ferrite material, for example, but it may be formed by other material. For instance, the drum core 10 may be formed by Mn—Zn ferrite material, Fe—Si—Cr, Fe—Si—Al, Fe—Si—Cr—Al, or other soft magnetic alloy material, Fe, Ni, or other magnetic metal material, amorphous magnetic metal material, or nanocrystal magnetic metal material.

The dimensions of the coil component 500 are 3.2 mm in length, 2.5 mm in width, and 2.5 mm in height, for example. Here, the length of the coil component 500 indicates the dimension in the axial direction (X direction in FIG. 2), while its width indicates the dimension in the direction crossing at right angles with the X direction and running parallel with the mounting face (Y direction in FIG. 2), and its height indicates the dimension in the direction crossing at right angles with the X direction and Y direction (Z direction in FIG. 2), of the winding core 12 of the drum core 10. The dimensions of the drum core 10 are 3.0 mm in length (dimension in the X direction in FIG. 2), 2.5 mm in width (dimension in the Y direction in FIG. 2), and 1.6 mm in height (dimension in the Z direction in FIG. 2), for example. The winding core 12 of the drum core 10 has a width (dimension in the Y direction in FIG. 2) of 1.6 mm and a height (dimension in the Z direction in FIG. 2) of 0.8 mm, for example.

The winding part 30 comprises two conductive wires 32, 34. The conductive wire 32 is wound around the winding core 12, with one end electrically connected to the terminal electrode 40 and the other end electrically connected to the terminal electrode 46. The conductive wire 34 is wound around the winding core 12, with one end electrically connected to the terminal electrode 42 and the other end electrically connected to the terminal electrode 44. The conductive wire 32 is wound around the winding core 12 over the conductive wire 34. The conductive wires 32, 34 each have a construction of a core wire 36 made of copper whose peripheral face is covered with an insulating film 38 made of polyamide imide, for example. The core wire 36 may be formed by a metal other than copper; for example, it may be formed by silver, palladium, or silver-palladium alloy. The insulating film 38 may be formed by an insulating material other than polyamide imide; for example, it may be formed by polyester imide, polyurethane, or other resin material. The diameters of the conductive wires 32, 34 are 0.05 mm, for example. The conductive wires 32, 34 are wound around the winding core 12 by the same number of turns, respectively.

The flange part 14 has a bottom face 14A, a top face 14B, end faces 14C, 14D, and side faces 14E, 14F. The flange part 16 has a bottom face 16A, a top face 16B, end faces 16C, 16D, and side faces 16E, 16F. The bottom faces 14A, 16A, when the coil component 500 is mounted on a circuit board, will become faces opposing the circuit board. The side faces 14F, 16F are faces to which the winding core 12 is connected.

A concaved part 18 is formed on the end face 14C, while a concaved part 20 is formed on the end face 14D, of the flange part 14. The concaved parts 18, 20 are formed at positions across the centers of the end faces 14C, 14D in the vertical direction. The concaved parts 18, 20 are formed in a manner connecting to the base portions via tapered faces from the end faces 14C, 14D, for example. The tapered faces and bases of the concaved parts 18, 20 are considered parts of the end faces 14C, 14D, respectively. The angles of the tapered faces of the end faces 14C, 14D are set as deemed appropriate according to the directions in which the conductive wires 32, 34 are led out, etc. Just like the concaved parts 18, 20 formed in the flange part 14, a concaved part 22 is formed on the end face 16C, while a concaved part 24 is formed on the end face 16D, of the flange part 16. The thicknesses of the flange parts 14, 16 are 0.6 mm, for example. The depths of the concaved parts 18, 20, 22, 24 are 0.5 mm, for example, while the widths of their base parts are 0.7 mm, for example.

The terminal electrodes 40, 42 are provided on the flange part 14. The terminal electrodes 44, 46 are provided on the flange part 16. The terminal electrode 40 is constituted by a terminal metal plate 50, while the terminal electrode 42 is constituted by a terminal metal plate 52. The terminal electrode 44 is constituted by a terminal metal plate 54, while the terminal electrode 46 is constituted by a terminal metal plate 56. The terminal metal plates 50, 52, 54, 56 are Sn-plated phosphor bronze plates, for example, but brass plates, tough pitch copper plates, or plates of other metals may be used.

The terminal metal plate 50 is attached to the flange part 14 in a manner extending from the bottom face 14A, via the side face 14E, to the top face 14B, while also extending to the concaved part 18 provided on the end face 14C, of the flange part 14. The terminal metal plate 52 is attached to the flange part 14 in a manner extending from the bottom face 14A, via the side face 14E, to the top face 14B, while also extending to the concaved part 20 provided on the end face 14D, of the flange part 14. Similarly, the terminal metal plate 54 is attached to the flange part 16 in a manner extending from the bottom face 16A, via the side face 16E, to the top face 16B, while also extending to the concaved part 24 provided on the end face 16D, of the flange part 16. The terminal metal plate 56 is attached to the flange part 16 in a manner extending from the bottom face 16A, via the side face 16E, to the top face 16B, while also extending to the concaved part 22 provided on the end face 16C, of the flange part 16.

Figure 6:
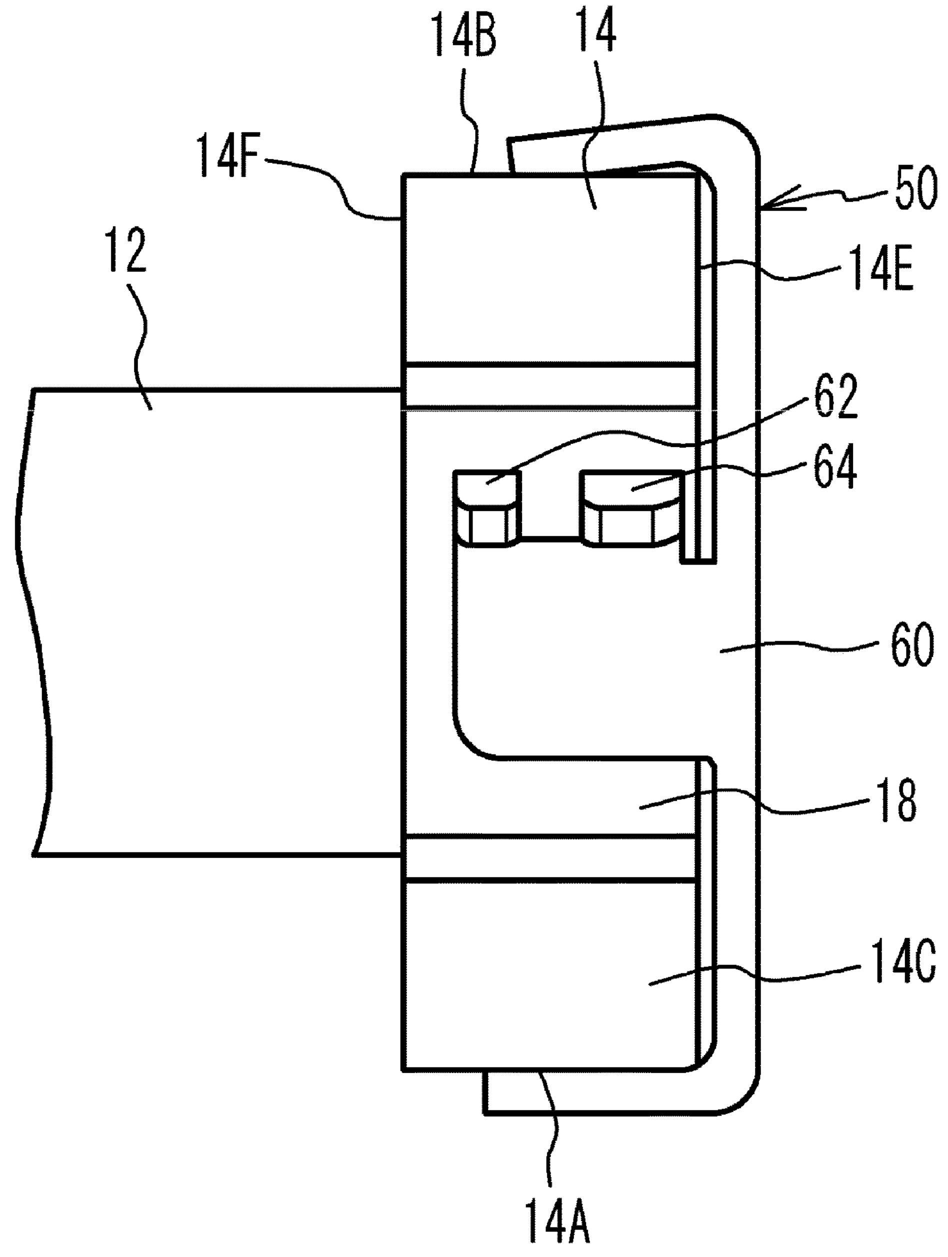
FIG. 6 is a drawing for explaining a terminal metal plate of the coil component in FIG. 2.

FIG. 6 is a drawing for explaining the terminal metal plate 50 of the coil component 500. It should be noted that, since the terminal metal plates 52, 54, 56 have the same construction as the terminal metal plate 50, only the terminal metal plate 50 is explained and the terminal metal plates 52, 54, 56 are not explained.

As shown in FIG. 6, the terminal metal plate 50 comprises a metal plate body 60, a locking tab 62 extending from the metal plate body 60, and a joining tab 64 placed at a distance from the locking tab 62 and extending from the metal plate body 60. The metal plate body 60 is attached to the surface of the flange part 14 with the side on one end pressed against the bottom face 14A, and the side on the other end pressed against the top face 14B, of the flange part 14. The locking tab 62 and joining tab 64 are placed inside the concaved part 18 provided on the end face 14C. The locking tab 62 is provided for the purpose of locking the conductive wire 32 by sandwiching it with the metal plate body 60. The joining tab 64, which is joined to the conductive wire 32 by means of welding, is provided for the purpose of electrically connecting the conductive wire 32 with the terminal metal plate 50.

As shown in FIGS. 2, 3A, 3B, 4A, 4B and 5, one end part of the conductive wire 32 is joined to the joining tab 64 of the terminal metal plate 50 by means of welding. As a result, the fused portion rises and a rounded, dome-shaped welded part 70 is formed, and by this welded part 70, a lead part 33A constituted by the conductive wire 32 being led out from the winding part 30 is electrically connected to the terminal electrode 40. The other end part of the conductive wire 32 is joined to the joining tab 64 of the terminal metal plate 56 by means of welding. As a result, the fused portion rises and a rounded, dome-shaped welded part 76 is formed, and by this welded part 76, a lead part 33B constituted by the conductive wire 32 being led out from the winding part 30 is electrically connected to the terminal electrode 46. Similarly, one end part of the conductive wire 34 is joined to the joining tab 64 of the terminal metal plate 52 by means of welding and thus a rounded, dome-shaped welded part 72 is formed, and by this welded part 72, a lead part 35A constituted by the conductive wire 34 being led out from the winding part 30 is electrically connected to the terminal electrode 42. The other end part of the conductive wire 34 is joined to the joining tab 64 of the terminal metal plate 54 by means of welding and thus a rounded, dome-shaped welded part 74 is formed, and by this welded part 74, a lead part 35B constituted by the conductive wire 34 being led out from the winding part 30 is electrically connected to the terminal electrode 44. The welded parts 70, 72, 74, 76 are formed by means of laser welding, arc welding, or the like.

Of the conductive wire 32, the lead part 33A positioned between the winding part 30 and the welded part 70 is locked in a manner being sandwiched between an engagement part 90 constituted by the locking tab 62 of the terminal metal plate 50 that has been bent, and a foundation part 80 constituted by the metal plate body 60 of the terminal metal plate 50. Also, of the conductive wire 32, the lead part 33B positioned between the winding part 30 and the welded part 76 is locked in a manner being sandwiched between an engagement part 96 constituted by the locking tab 62 of the terminal metal plate 56 that has been bent, and a foundation part 86 constituted by the metal plate body 60 of the terminal metal plate 56.

Similarly, of the conductive wire 34, the lead part 35A positioned between the winding part 30 and the welded part 72 is locked in a manner being sandwiched between an engagement part 92 constituted by the locking tab 62 of the terminal metal plate 52 that has been bent, and a foundation part 82 constituted by the metal plate body 60 of the terminal metal plate 52. Also, of the conductive wire 34, the lead part 35B positioned between the winding part 30 and the welded part 74 is locked in a manner being sandwiched between an engagement part 94 constituted by the locking tab 62 of the terminal metal plate 54 that has been bent, and a foundation part 84 constituted by the metal plate body 60 of the terminal metal plate 54.

The conductive wire 32 projects from the welded part 70 by a portion of a prescribed length from a tip face 32A which is a cross-section at the tip on the lead part 33A side, and also projects from the welded part 76 by a portion of a prescribed length from a tip face 32B which is a cross-section at the tip on the lead part 33B side. Similarly, the conductive wire 34 projects from the welded part 72 by a portion of a prescribed length from a tip face 34A which is a cross-section at the tip on the lead part 35A side, and also projects from the welded part 74 by a portion of a prescribed length from a tip face 34B which is a cross-section at the tip on the lead part 35B side.

The welded part 70 is formed on the foundation part 80. Similarly, the welded parts 72, 74, 76 are formed on the foundation parts 82, 84, 86. The welded parts 70, 72, 74, 76 are joined to the foundation parts 80, 82, 84, 86 via alloy layers. Now, a vertical line which passes through the peak point 71 at which the height of the welded part 70 from the foundation part 80 becomes the highest, and which also crosses at right angles with the foundation part 80, is defined as a vertical line 73. The welded part 70 is shaped in such a way that the distance from the vertical line 73 to the surface 75 of the welded part 70 as viewed in a direction parallel with the foundation part 80, is longer at a point closer to the foundation part 80 when viewed at least in one direction from the vertical line 73. The distance from the vertical line 73 to the surface 75 of the welded part 70 as viewed in a direction parallel with the foundation part 80, is continuously longer from the peak point 71 toward the foundation part 80. The welded parts 72, 74, 76 have the same shape.

[Manufacturing Method]

Next, a method for manufacturing the coil component 500 is explained. First, a drum core 10 is formed. For example, a binder is mixed into a Ni—Zn ferrite material and the mixed material is compression-molded using a molding die, to obtain a drum-shaped molded body. If necessary, this molded body may be deburred. This molded body is sintered at a prescribed sintering temperature to obtain a drum core 10 having a winding core 12 and flange parts 14, 16. Next, terminal metal plates 50, 52 are bent, clinched or otherwise installed and placed on the flange part 14 of the drum core 10. Terminal metal plates 54, 56 are bent, clinched or otherwise installed and placed on the flange part 16 of the drum core 10. A conductive wire 34 is wound by the necessary number of times around the outer peripheral face of the winding core 12 of the drum core 10, and then a conductive wire 32 is wound by the necessary number of times around the winding core 12 on the outside of the conductive wire 34, to form a winding part 30. The conductive wires 32, 34 are wound by the same number of times. The end parts of the conductive wire 32 are led out onto the terminal metal plates 50, 56 and joined for the purpose of electrically connecting the conductive wire 32 and the terminal metal plates 50, 56. Similarly, the end parts of the conductive wire 34 are led out onto the terminal metal plates 52, 54 and joined for the purpose of electrically connecting the conductive wire 34 and the terminal metal plates 52, 54.

The method for manufacturing the coil component 500 is explained in detail by referring to FIGS. 7A to 8B. FIGS. 7A to 8B are drawings for explaining the method for manufacturing the coil component 500. It should be noted that, while the vicinity of the terminal metal plate 50 is shown and explained in FIGS. 7A to 8B, the vicinities of the terminal metal plates 52, 54, 56 are the same and therefore not explained here.

Figure 7A:
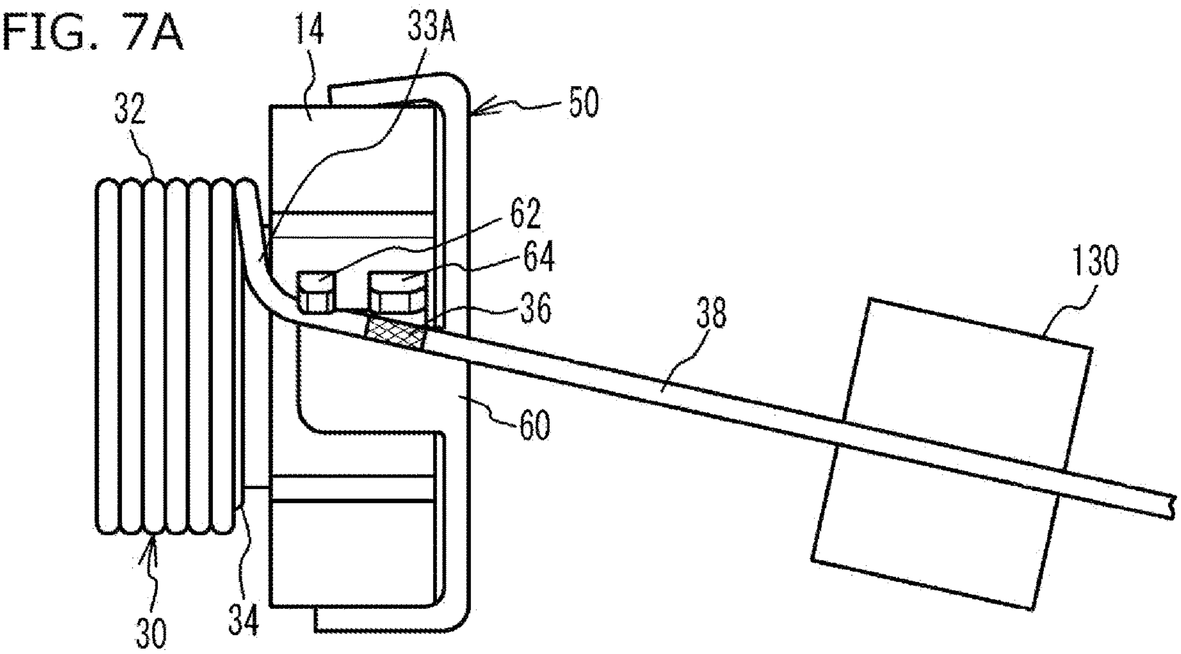
FIGS. 7A and 7B are drawings explaining a method for manufacturing the coil component pertaining to the first embodiment of the invention under the present application for patent (part 1).

As shown in FIG. 7A, the terminal metal plate 50 having a metal plate body 60, as well as a locking tab 62 and a joining tab 64 each extending from the metal plate body 60, is bent or otherwise placed on the flange part 14 of the drum core 10. The conductive wires 32, 34 are wound around the winding core 12 of the drum core 10, to form a winding part 30. One end part side of the conductive wire 32 is led out onto the metal plate body 60 of the terminal metal plate 50 using a clamp or other jig 130. Next, an insulating film 38 is removed from the portion of the conductive wire 32 sandwiched between the metal plate body 60 and the joining tab 64, to expose a core wire 36. The removal of the insulating film 38 may be performed by irradiating laser beam, for example.

Figure 7B:
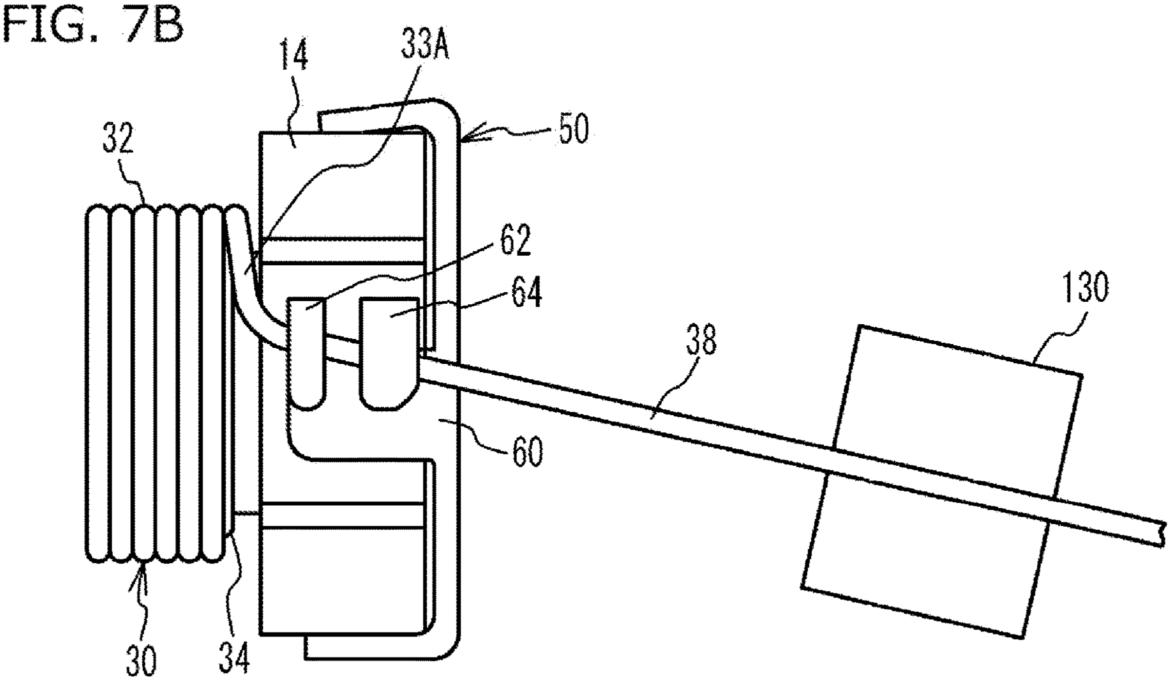

As shown in FIG. 7B, both the locking tab 62 and joining tab 64 are bent at normal temperature, and a lead part 33A constituted by the conductive wire 32 being led out from the winding part 30 is sandwiched between the metal plate body 60 and the locking tab 62 and joining tab 64 and fixed in place.

Figure 8A:
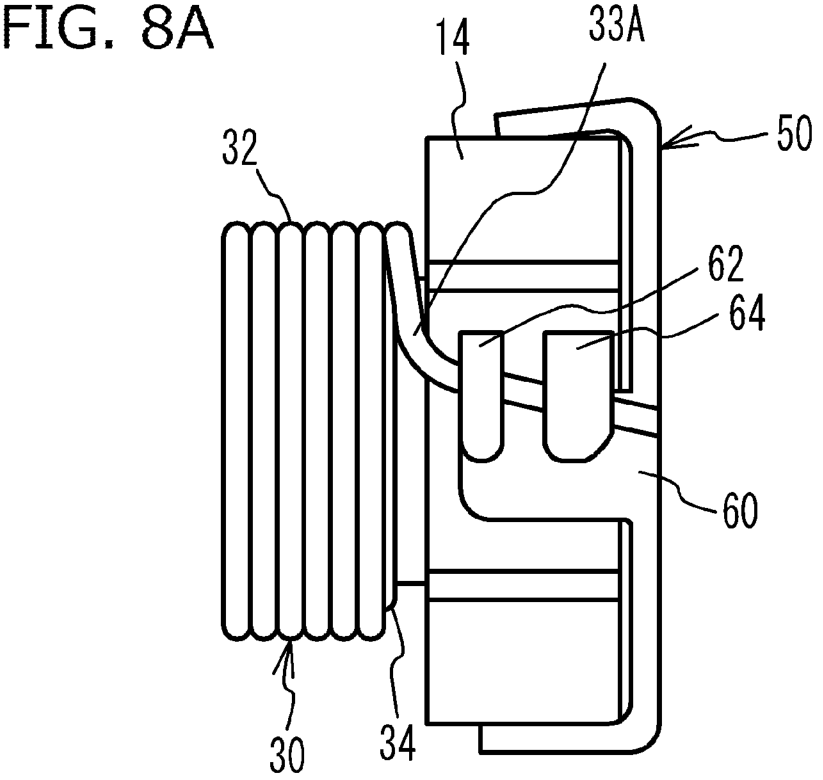
FIGS. 8A and 8B are drawings explaining a method for manufacturing the coil component pertaining to the first embodiment of the invention under the present application for patent (part 2).

As shown in FIG. 8A, the conductive wire 32 is cut to create a state where the tip part of the conductive wire 32 is positioned on the outer side of the joining tab 64. For the cutting of the conductive wire 32, any generally performed method may be employed. The conductive wire 32 may be cut by press-cutting using the jig used for bending the terminal metal plate 50 and the locking tab 62 and joining tab 64, for example. In this case, the manufacturing steps can be reduced because the bending of the locking tab 62 and joining tab 64, and the cutting of the conductive wire 32, can be performed at the same time. The position at which the conductive wire 32 is cut may be on the metal plate body 60. Press-cutting it on the metal plate body 60 allows for prevention of damage to the magnetic body or, conversely, breakage, etc., of the cutting blade. Also, any cutting blade used for press-cutting can produce a cut only through a movement in one direction, which reduces any space limitation on its placement. As a result, the cutting position can be set inside the external dimensions of the coil component 500 to prevent the tip part of the conductive wire 32 from protruding out of the external dimensions. This, in turn, prevents the tip part of the conductive wire 32 from interfering with other components, for example.

Figure 8B:
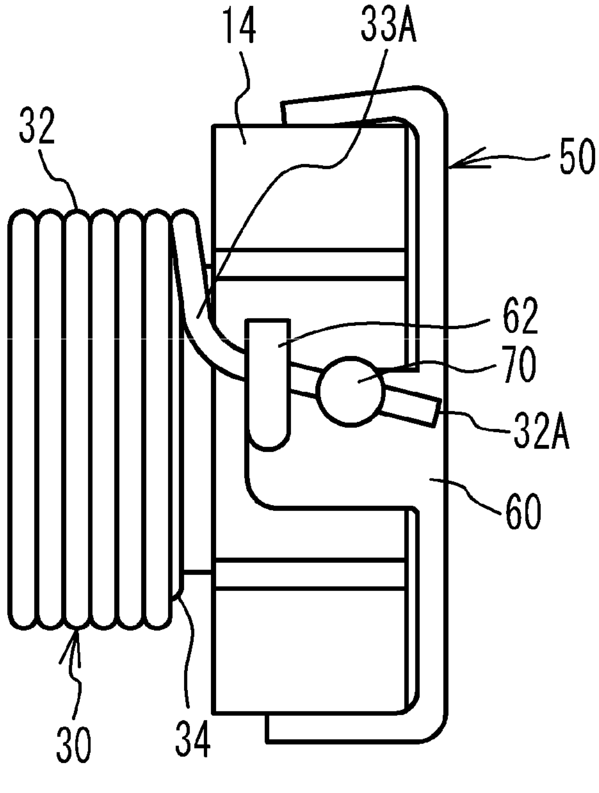

As shown in FIG. 8B, the joining tab 64 is welded with the conductive wire 32 in a state where the tip part of the conductive wire 32 is positioned on the outer side of the joining tab 64, to join the joining tab 64 with the conductive wire 32. As a result, a welded part 70 is formed, causing the lead part 33A constituted by the conductive wire 32 being led out from the winding part 30 at the welded part 70, to be electrically connected with the terminal metal plate 50. For the welding of the joining tab 64 with the conductive wire 32, laser welding may be used, for example; however, arc welding or other welding method may also be used. By irradiating laser beam onto the joining tab 64 and thus fusing the joining tab 64, the fused portion rises and a rounded, dome-shaped welded part 70 is formed. Because the joining tab 64 is joined with the conductive wire 32 in a state where the tip part of the conductive wire 32 is positioned on the outer side of the joining tab 64, the conductive wire 32 projects from the welded part 70 by a portion of a prescribed length from the tip face 32A.

Now, when laser beam is irradiated onto the joining tab 64 to weld the joining tab 64 with the conductive wire 32, the power of laser beam, irradiating position, beam diameter, etc., are adjusted to achieve a temperature at which the joining tab 64 will fuse but the metal plate body 60 will not fuse. For example, the power of laser beam, irradiating position, beam diameter, etc., are adjusted so that the joining tab 64 will reach 900° C. or above and fuse, while the metal plate body 60 will reach only 500° C. or so and not fuse. By controlling the temperature of the metal plate body 60, the degree to which the fused portion, where the joining tab 64 has fused, wets, and spreads over the metal plate body 60 can be controlled. The higher the temperature of the metal plate body 60, the easier it becomes for the fused portion to wet and spread, and consequently the height of the welded part 70 becomes lower. Conversely, the lower the temperature of the metal plate body 60, the more difficult it becomes for the fused portion to wet and spread, and consequently the height of the welded part 70 becomes higher. As described above, controlling the irradiation of laser beam and thereby controlling the temperature of the metal plate body 60 to an appropriate temperature causes a welded part 70 to form whose shape is such that the distance from the vertical line 73 to the surface 75 of the welded part 70 as viewed in a direction parallel with the foundation part 80 becomes longer at a point closer to the foundation part 80, as shown in FIG. 5. Thereafter, the tip part of the conductive wire 32 that projects from the welded part 70 may be partially cut to shorten the length by which the tip part of the conductive wire 32 projects from the welded part 70, so that the tip part of the conductive wire 32 projects from the welded part 70 while still contained within the range overlapping with the drum core 10.

It should be noted that, while the manufacturing method in this embodiment illustrated an example where the insulating film 38 was removed from the portion of the conductive wire 32 corresponding to the joining tab 64, the step to remove the insulating film 38 may not be necessary depending on the material of the insulating film 38.

As described above, the coil component 500 is such that the distance from the vertical line 73 to the surface 75 of the welded part 70 as viewed in a direction parallel with the foundation part 80 becomes longer at a point closer to the foundation part 80 when viewed at least in one direction from the vertical line 73. As a result, the height of the welded part 70 becomes lower. If the welded part 70 is protruding to the outside of the outline of the coil component 500, the welded part 70 may contact external members and consequently separate from the foundation part 80, causing the electrical connection between the conductive wire 32 and the terminal electrode 40 to be lost. This is why the welded part 70 is contained in the concaved part 18 provided on the flange part 14. When the height of the welded part 70 is lower, the depth of the concaved part 18 can be made shallow. For example, assume that the concaved part 18 must be formed deep; in this case, it is difficult to make the drum core 10 small when the strength of the drum core 10, etc., are considered. With the coil component 500, however, the concaved part 18 can be made shallow and therefore the drum core 10 can be made small. This allows for size reduction of the coil component 500. It should be noted that, even when the flange part has no concaved part formed on it for accommodating the welded part, size reduction of the coil component is still possible because the height of the welded part is lower.

Also, the fact that the distance from the vertical line 73 to the surface 75 of the welded part 70 as viewed in a direction parallel with the foundation part 80 becomes longer at a point closer to the foundation part 80, facilitates the emission, toward the upper side of the foundation part 80, of the radiation heat energy emitted from the fused portion when the joining tab 64 fuses and the welded part 70 is formed, and also of the scattering light from the irradiation of laser beam to the joining tab 64. As a result, the effects of the radiation heat energy and scattering light of laser beam on the foundation part 80 and winding part 30 can be reduced. Since the emission of the radiation heat energy and scattering light of laser beam toward the winding part 30 is prevented, the welded part 70 can be placed near the winding part 30. This point, too, allows for size reduction of the coil component 500. To prevent the emission of the radiation heat energy and scattering light of laser beam toward the foundation part 80 and winding part 30, the angle θ formed between the portion of the foundation part 80 joined by the welded part 70 and the surface of the welded part 70 (refer to FIG. 5), is preferably 80° or smaller, or more preferably 70° or smaller, or yet more preferably 60° or smaller.

As shown in FIG. 5, the maximum distance L from the vertical line 73 to the surface 75 of the welded part 70 in parallel with the foundation part 80 as viewed in the direction of the lead part 33A, is preferably longer than the distance H from the foundation part 80 to the peak point 71 of the welded part 70. In this case, the welded part 70 is shaped longer in a direction parallel with the foundation part 80, and also shaped in such a way that the height from the foundation part 80 is lower. This allows for lowering of the height of the welded part 70, and consequently size reduction of the coil component 500. From the viewpoint of size reduction of the coil component 500, the maximum distance L from the vertical line 73 to the surface 75 of the welded part 70 in parallel with the foundation part 80 as viewed in the direction of the lead part 33A, is preferably 1.2 times or greater than, or more preferably 1.5 times or greater than, or yet more preferably two times or greater than, the distance H from the foundation part 80 to the peak point 71 of the welded part 70.

Figure 9A:
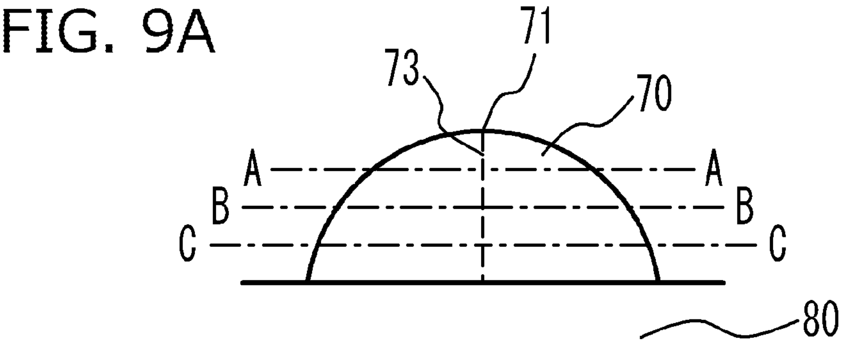
Figure 9B:
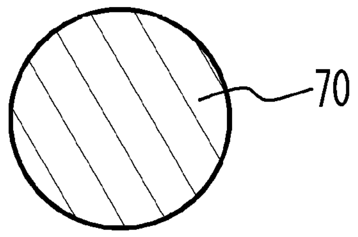
FIGS. 9B to 9D are views of cross-sections A-A to C-C, respectively, in FIG. 9A.
Figure 9C:
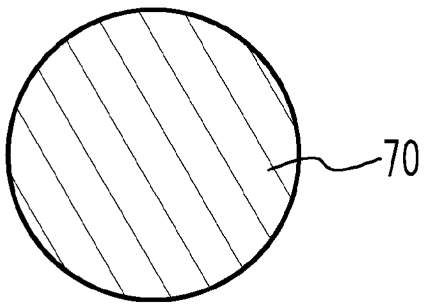
Figure 9D:
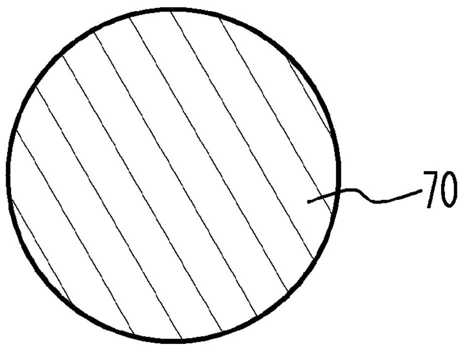

FIG. 9A is a side view of the welded part 70, while FIGS. 9B to 9D are views of cross-sections A-A to C-C, respectively, in FIG. 9A. As shown in FIGS. 9A to 9D, the welded part 70 is such that, when cut in a direction vertical to the vertical line 73, the area of its cross-section is smaller on the peak point 71 side and larger on the foundation part 80 side. The cross-section area of the welded part 70, when cut in a direction orthogonal to the vertical line 73, is continuously larger from the peak point 71 toward the foundation part 80. That is to say, preferably the welded part 70 has a larger area for its cross-section orthogonal to the vertical line 73, when the cross-section is closer to the foundation part 80. Such construction results in a lower height of the welded part 70, which allows for size reduction of the coil component 500.

As shown in FIG. 5, preferably the welded part 70 has a dome shape, and the angle θ formed between the portion of the foundation part 80 contacted by the welded part 70 and the surface 75 of the welded part 70 is preferably 60° or smaller. This way, the height of the welded part 70 becomes lower, to allow for size reduction of the coil component 500. Another point is that, even when an external force is applied laterally to the welded part 70, separation of the welded part 70 from the foundation part 80 due to this external force is prevented. From the viewpoints of size reduction of the coil component 500 and prevention of separation of the welded part 70, the angle θ formed between the portion of the foundation part 80 contacted by the welded part 70 and the surface 75 of the welded part 70 is preferably 55° or smaller, or more preferably 50° or smaller, or yet more preferably 45° or smaller.

With the coil component 500, the terminal electrode 40 comprises an engagement part 90 that locks the lead part 33A by sandwiching it with the foundation part 80. This can prevent the position of the conductive wire 32 from moving relative to the joining tab 64 before and after the welding of the conductive wire 32 with the joining tab 64.

Second Embodiment

The coil component 600 pertaining to the second embodiment is explained. The coil component 600 pertaining to the second embodiment is constitutionally identical to the coil component 500 pertaining to the first embodiment, except for the terminal electrode 40. In other words, FIGS. 2, 3A, 3B, 4A, and 4B illustrating the coil component 500 pertaining to the first embodiment, illustrate the coil component 600 pertaining to the second embodiment, except for the terminal electrode 40. This means that, for each part constituting the coil component 600 pertaining to the second embodiment, except for the terminal electrode 40, the coil component 500 pertaining to the first embodiment can be applied. Also, for the method for manufacturing the coil component 600 pertaining to the second embodiment, what is described for the coil component 500 pertaining to the first embodiment can be applied.

Figure 10:
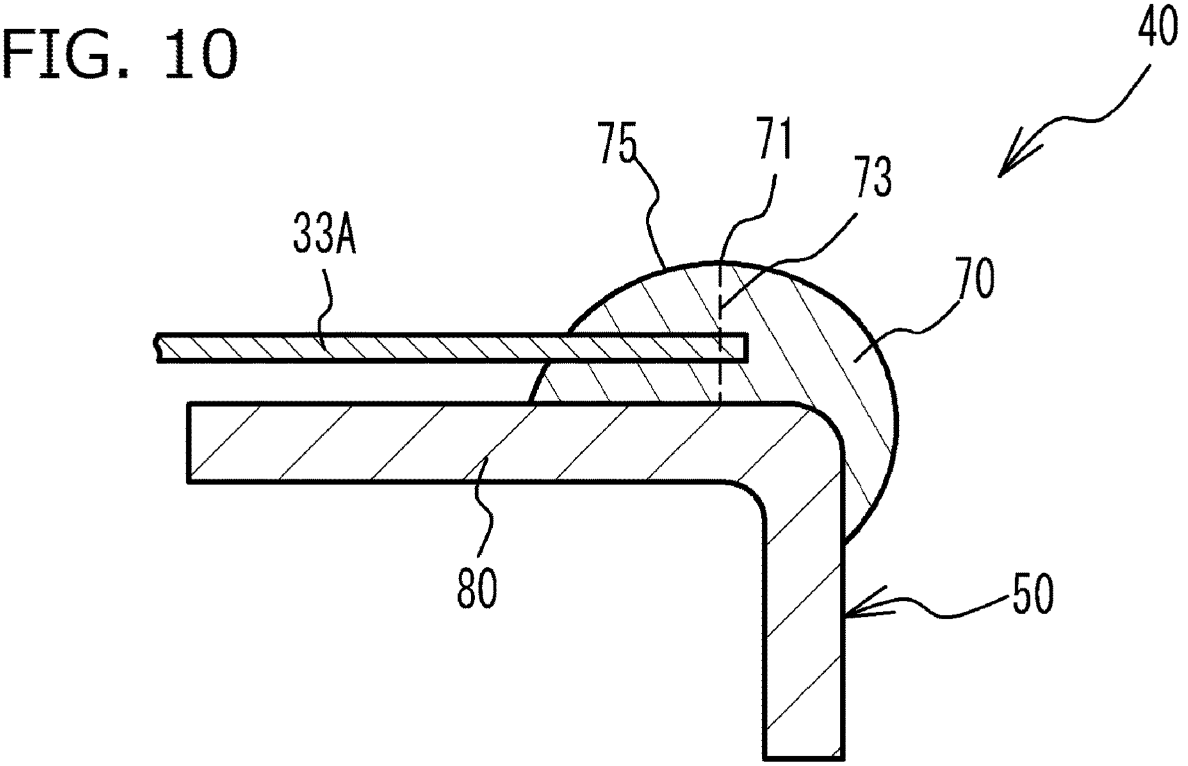
FIG. 10 is a cross-sectional view of a terminal electrode in the coil component pertaining to the second embodiment of the invention under the present application for patent.

FIG. 10 is a cross-sectional view of the terminal electrode 40 in the coil component 600 pertaining to the second embodiment of the invention under the present application for patent, and a drawing showing cross-section A-A of the terminal electrode 40 in FIG. 3A. To be specific, FIG. 10 is a view of a cross-section which is orthogonal to the surface of the flange part 14 on which the welded part 70 is provided and which also passes through the peak point 71 at which the height of the welded part 70 from the foundation part 80 becomes the highest and through the center of the conductive wire 32 (center of the lead part 33A). In the first embodiment, the welded part 70 was formed on a flat, planar portion of the foundation part 80, as shown in FIG. 5; in the second embodiment, on the other hand, the welded part 70 is formed on the foundation part 80 in a manner covering the curved portion of the foundation part 80, as shown in FIG. 10. In this case, the distance from the vertical line 73 to the surface 75 of the welded part 70 as viewed in a direction parallel with the foundation part 80 only needs to be longer at a point closer to the foundation part 80 when viewed at least in the direction of the lead part 33A from the vertical line 73.

When the welded part 70 is provided in a manner covering the curved portion of the foundation part 80, as shown in FIG. 10, the welded part 70 protrudes to the outside of the foundation part 80. When the welded part 70 protrudes out from the foundation part 80, the welded part 70 becomes prone to contact with external members. As a result, preferably the welded part 70 is formed on the foundation part 80 in a manner contained within the range where the surface of the flange part 14 on which the welded part 70 is provided overlaps the foundation part 80 in plan view, as shown in FIG. 3A. This way, the welded part 70 can be prevented from contacting external members. It also leads to size reduction of the coil component 600.

Figure 11:
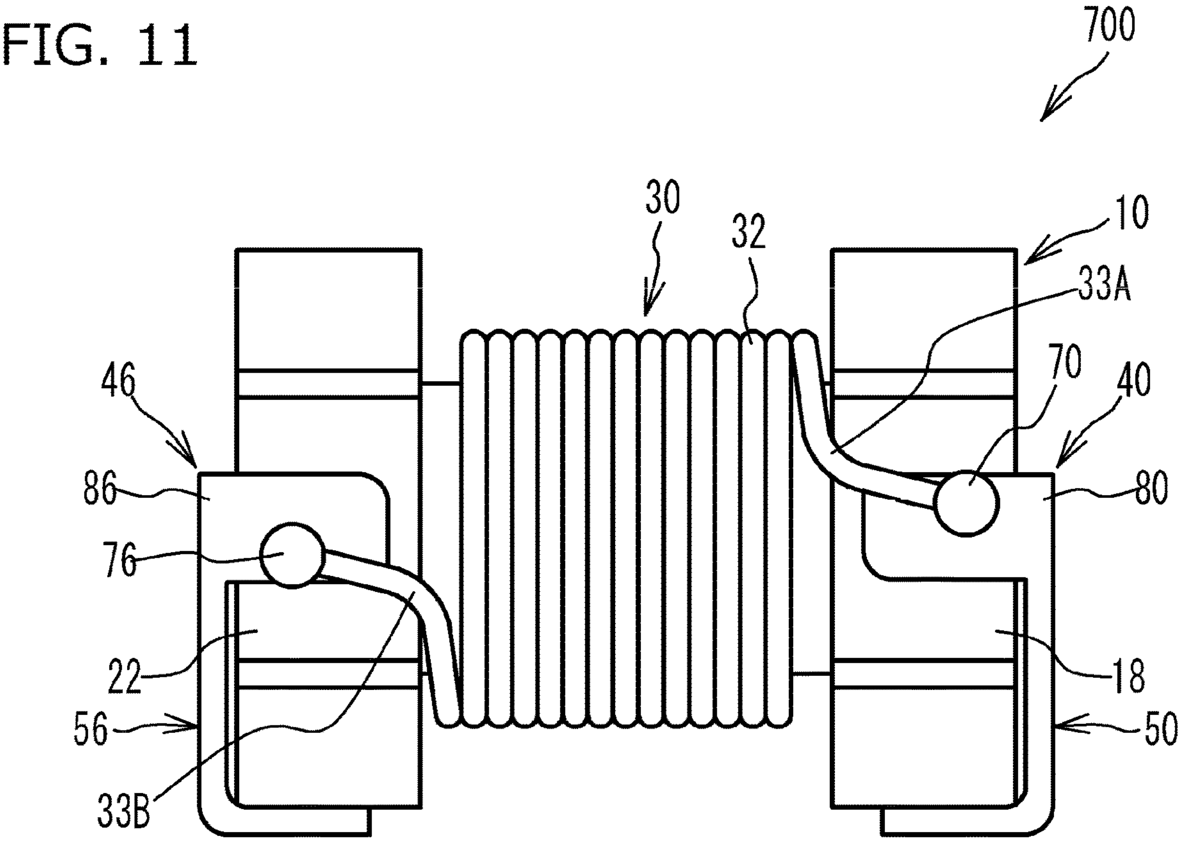
FIG. 11 is a drawing of a coil component for single line (single wire).
Figure 12:
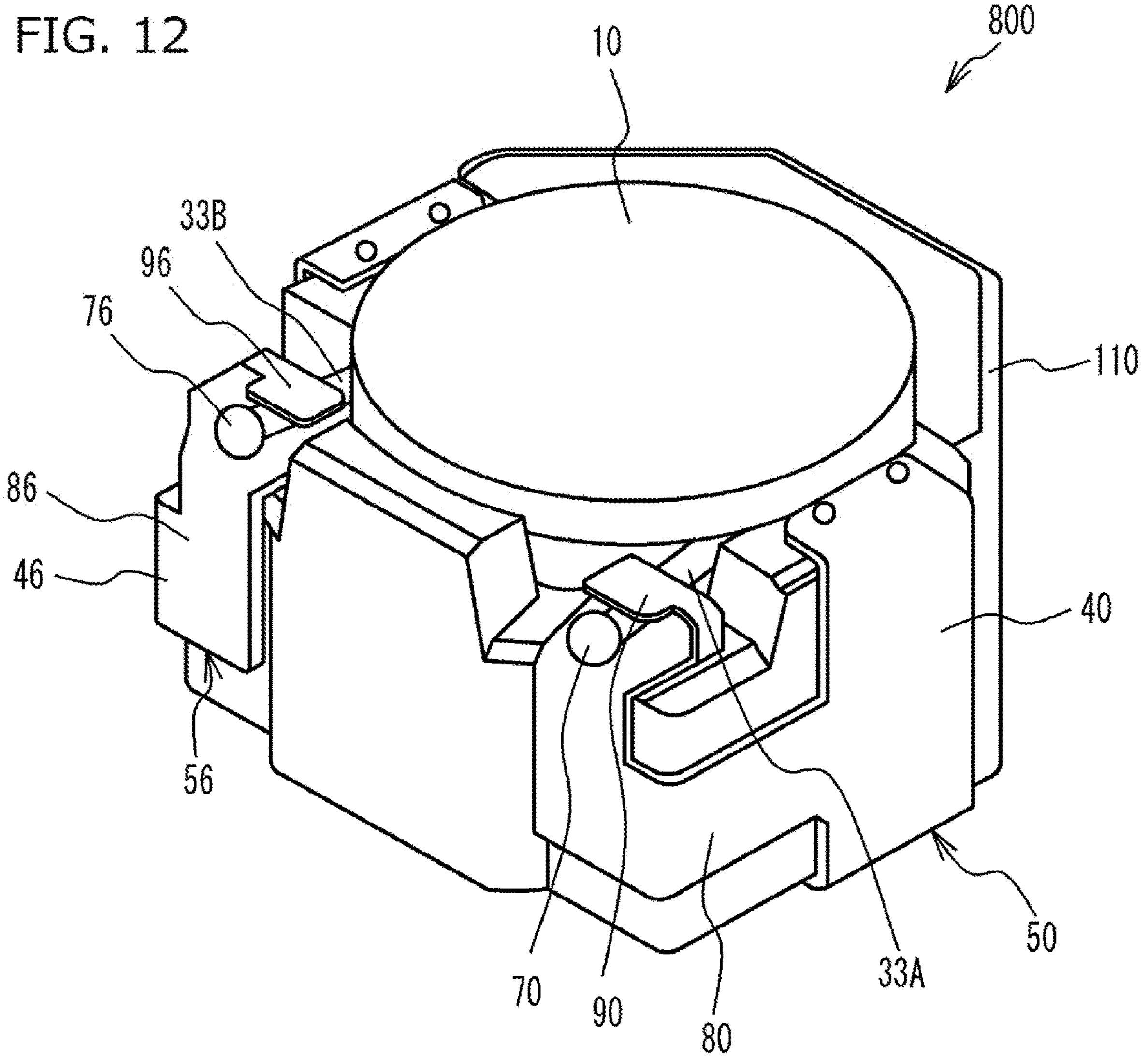
FIG. 12 is a perspective view of a coil component having an exterior core provided on the outer periphery of a drum core.

While the aforementioned first and second embodiments illustrated examples where the coil component was a common-mode filter, it may be a coil component for single line or any other coil component. FIG. 11 is a drawing of a coil component 700 for single line. As shown in FIG. 11, only the conductive wire 32 is wound, and the conductive wire 34 is not wound, around the winding core 12 of the drum core 10. On the flange part 14, only the terminal electrode 40 is provided and the terminal electrode 42 is not provided, while on the flange part 16, only the terminal electrode 46 is provided and the terminal electrode 44 is not provided. It should be noted that, while the engagement parts 90, 96 are not provided in FIG. 11, the engagement parts 90, 96 may be provided. FIG. 12 is a perspective view of a coil component 800 having an exterior core provided on the outer periphery of a drum core. As shown in FIG. 12, the exterior core 110 is provided on the outer periphery of the drum core 10. Only the conductive wire 32 is wound, and the conductive wire 34 is not wound, around the winding core 12 of the drum core 10. The external electrodes 40, 46 are attached to the exterior core 110. The lead parts 33A, 33B constituted by the conductive wire 32 are led out onto the terminal electrodes 40, 46 placed on the exterior core 110.

As explained above, the substrate body may be a drum core 10 having flange parts 14, 16 provided at both ends of a winding core 12, or it may be constituted by a drum core 10 and an exterior core 110 placed on the outer periphery of the drum core 10. When it is constituted by a drum core 10 and an exterior core 110, terminal electrodes 40, 46 may be provided on the exterior core 110. Also, the substrate body may be other than a drum core 10 or what is constituted by a drum core 10 and an exterior core 110; for example, it may be a core (T-core) having a flange part provided only at one end part of a winding core, or other than a core.

Figure 13:
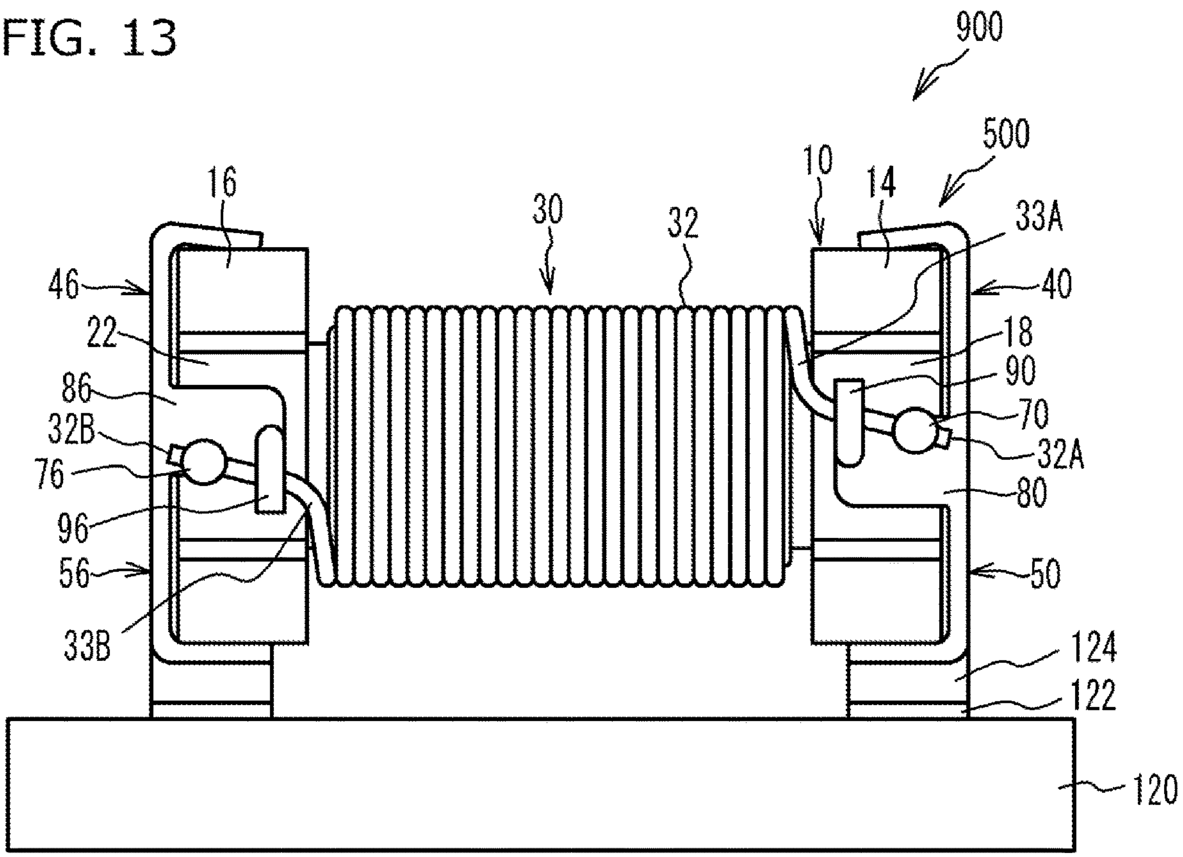
FIG. 13 is a drawing showing an electronic device comprising the coil component pertaining to the first embodiment of the invention under the present application for patent.

FIG. 13 is a drawing showing an electronic device 900 comprising the coil component 500 pertaining to the first embodiment of the invention under the present application for patent. As shown in FIG. 13, the electronic device 900 comprises a circuit board 120 and the coil component 500 mounted on the circuit board 120. The coil component 500 is mounted on the circuit board 120 when its terminal electrodes 40, 42, 44, 46 (only the terminal electrodes 40, 46 are shown in FIG. 13) are joined to an electrode 122 on the circuit board 120 by a solder 124.

The electronic device 900 is such that the coil component 500 is mounted on the circuit board 120. This way, an electronic device 900 having a coil component 500 of reduced size can be obtained. It should be noted that, while the coil component 500 in the first embodiment was mounted on the circuit board 120 in the illustrated example of the electronic device 900, the coil component 600 in the second embodiment may be mounted, or the coil component 700, coil component 800, or any of various modes of the coil component proposed by the invention under the present application for patent, other than the coil component 500, may be mounted.

The foregoing described the embodiments of the invention under the present application for patent in detail; it should be noted, however, that the invention under the present application for patent is not limited to these specific embodiments, and various modifications and changes may be added to the extent that doing so does not deviate from the key points of the invention under the present application for patent as described in "What Is Claimed Is."

We claim:

1. A coil component comprising:

a substrate body;

a winding part formed by a conductive wire wound around a part of the substrate body; and terminal electrodes, each having: a foundation part constituted by a metal plate structure provided on a surface of a part of the substrate body; and a welded part formed on and affixed to a surface of the foundation part wherein a part of the metal plate structure is welded to the conductive wire at its lead part which is led out from the winding part where the lead part of the conductive wire is electrically connected to the terminal electrode, wherein a principal component of the foundation part and a principal component of the welded part are a same element;

wherein, based on a fictive vertical line which passes through a peak point of the welded part where its height measured from its bottom on the surface of the foundation part becomes a highest and which also intersects at right angles the surface of the foundation part, a distance from the fictive vertical line to an outer surface of the welded part as viewed in a direction parallel with the surface of the foundation part is longer at a point on the fictive vertical line closer to the surface of the foundation part when viewed at least in one direction from the vertical line, wherein the closer the point on the fictive vertical line to the surface the longer the distance from the point to the outer surface of the welded part becomes, and wherein the conductive wire is not exposed at the peak point of the welded part and is devoid of an insulating film and not in contact with the surface of the part of the substrate body in the welded part.

2. The coil component according to claim 1, wherein the distance from the fictive vertical line to the outer surface of the welded part as viewed in a direction parallel with the foundation part is longer at a point on the fictive vertical line closer to the surface of the foundation part when viewed at least in a direction of the lead part from the fictive vertical line.

3. The coil component according to claim 1, wherein a maximum distance from the fictive vertical line to the outer surface of the welded part in parallel with the surface of the foundation part, as viewed in the direction of the lead part, is longer than a distance from the surface of the foundation part to the peak point.

4. The coil component according to claim 1, wherein:

the welded part has a dome shape; and an angle formed between a portion of the surface of the foundation part contacted by the welded part and the outer surface of the welded part, is smaller than 60°.

5. The coil component according to claim 1, wherein the welded part has a larger area for a cross-section orthogonal to the fictive vertical line when the cross-section is closer to the surface of the foundation part.

6. The coil component according to claim 1, wherein the welded part is formed on the surface of the foundation part in a manner contained within a range where a surface of the substrate body on which the welded part is provided overlaps the surface of the foundation part in plan view.

7. The coil component according to claim 1, wherein the terminal electrodes each have an engagement part that locks the conductive wire.

8. The coil component according to claim 1, wherein:

the substrate body is a core that includes a winding core and flange parts provided at end parts of the winding core in an axial direction;

the terminal electrodes are placed on the flange parts;

the winding part is formed by the conductive wire being wound around the winding core; and the lead parts are where the conductive wire is led out from the winding core to the terminal electrodes placed on the flange parts.

9. The coil component according to claim 1, wherein:

the substrate body includes a core that includes a winding core and flange parts provided at end parts of the winding core in an axial direction, and an exterior core placed on an outer periphery of the core;

the terminal electrodes are placed on the exterior core;

the winding part is formed by the conductive wire being wound around the winding core; and the lead parts are where the conductive wire is led out from the winding core to the terminal electrodes placed on the exterior core.

10. An electronic device, comprising:

the coil component according to claim 1; and a circuit board on which the coil component is mounted.

11. The coil component according to claim 1, wherein the same element contained in the foundation part and the welded part is copper.

12. The coil component according to claim 1, wherein the conductive wire passes through the welded part wherein a tip of the conductive wire protrudes from the welded part.

13. The coil component according to claim 1, wherein a thickness of the conductive wire is smaller than a thickness of the foundation part.

* * * * *